(No Model.)
W. A. CASWELL.
TOOL FOR FORMING BOTTLE NECKS.
No. 400,898. Patented Apr. 9, 1889.
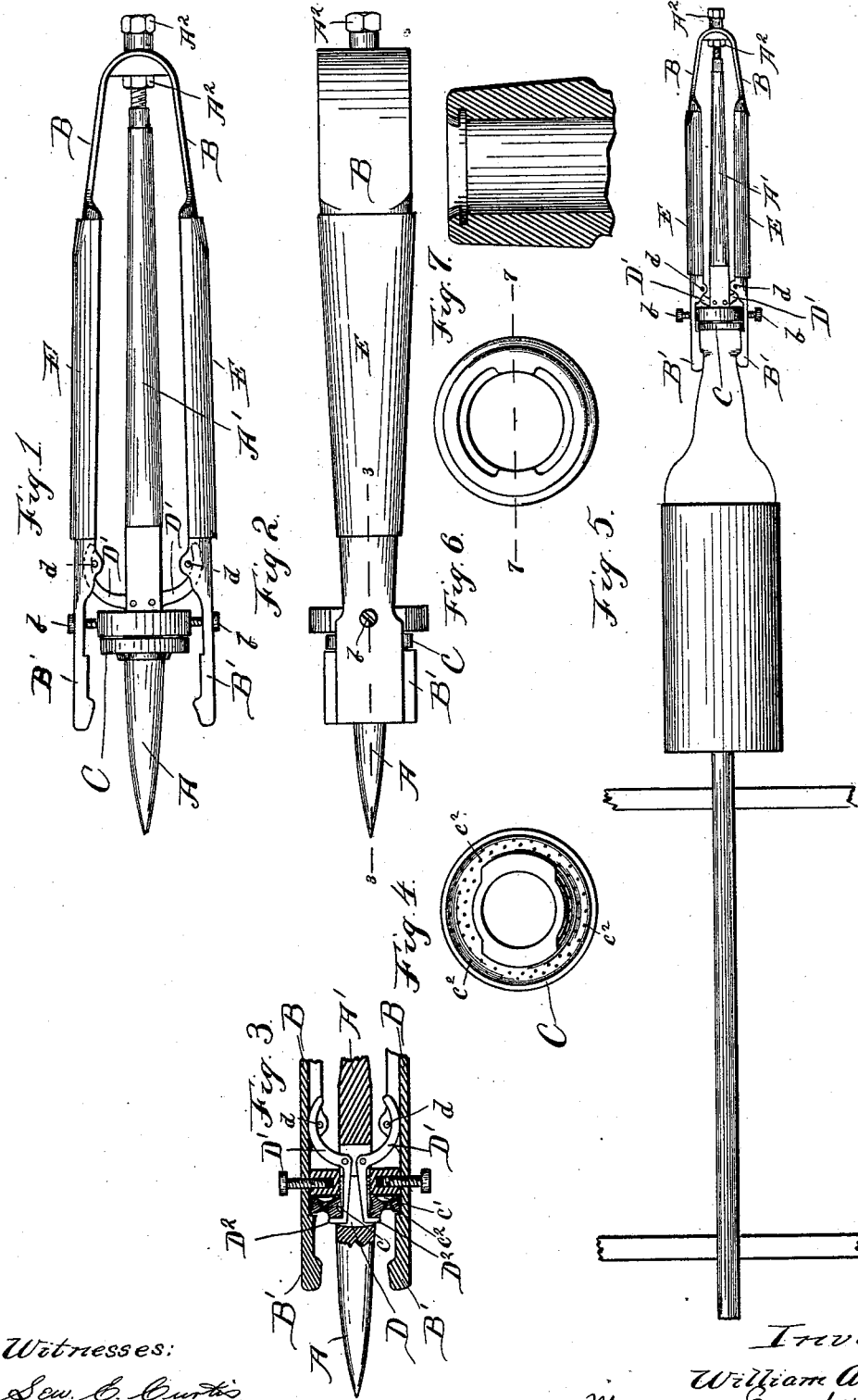
Witnesses:
Lew. E. Curtis
Daniel W. Barker
Inventor:
William A. Caswell
By Munday, Evarts & Adcock
His Attorneys

UNITED STATES PATENT OFFICE.

WILLIAM A. CASWELL, OF CHICAGO, ILLINOIS.

TOOL FOR FORMING BOTTLE-NECKS.

SPECIFICATION forming part of Letters Patent No. 400,898, dated April 9, 1889.

Application filed May 15, 1888. Serial No. 273,978. (No model.)

*To all whom it may concern:*

Be it known that I, WILLIAM A. CASWELL, a citizen of the United States, residing in Chicago, in the county of Cook and State of Illinois, have invented a new and useful Improvement in Tools for Forming Bottle-Necks, of which the following is a specification.

This invention relates to an improved tool for forming the necks of glass bottles, and is especially intended for use in the manufacture of the peculiar form of bottle-neck heretofore invented by me, and for which I have applied for Letters Patent of the United States.

In the manufacture of bottles the bottle, after being blown and otherwise molded into proper form, is ordinarily, while still in the ductile state, fitted into a cup at the end of a rod with the neck of the bottle projecting, and the neck is turned, formed, or molded by aid of a tool, while under a rotary motion given to the bottle, by rolling the rod upon a pair of supports. This tool usually consists of a conical spindle, which is inserted into the mouth of the bottle, and a pair of spring-arms, which clasp the outside of the bottle and impart to it a proper configuration by reason of the rotary movement of the bottle against the tool.

In the present improved tool I provide a mold or loose washer, which comes in contact with the upper rim of the bottle-mouth, and rotating with the bottle imparts to the glass at this portion the peculiar shape which I desire, or any irregular shape wanted, and which could not be imparted to the glass by a stationary tool not revolving therewith; and I also provide said spindle with a retractile point or points for forming within the neck of the bottle an internal groove. These points, in the preferred form, are so contrived and connected to the spring-jaws that when the spring-jaws are closed upon the bottle the points are projected, and are withdrawn when the spring-jaws are removed or spread apart. I also provide the mold or loose washer, above alluded to, with perforations in its surface so small that the glass will not mold into them, and yet large enough to permit the passage of air, so that the glass can come in close contact with the surface; and to facilitate the use of the tool I furnish the spring-arms of the jaws with a non-conducting guard where the hand of the operator comes in contact therewith, and consisting, preferably, of fibrous asbestus cement.

In the accompanying drawings, which form a part of this specification, Figure 1 is a plan view of my improved tool. Fig. 2 is an edge view thereof. Fig. 3 is a section upon line 3 3 of Fig. 2. Fig. 4 is a face view of the loose washer. Fig. 5 shows the position of the tool in use upon a bottle. Fig. 6 is a plan view of a bottle-neck of the kind invented by me and above alluded to, and showing the character of work which the tool is capable of performing. Fig. 7 is a sectional view of the preceding figure, taken on line 7 7 thereof.

In the said drawings, A represents the conical spindle, of a size suitable to form the interior passage in the bottle-neck. It is extended rearwardly by an extension, A', and attached, in the ordinary manner, adjustably by nuts $A^2$ to the bow of the clamping spring-jaws B, which extend forward to the spindle A, and at their free ends are formed into the molding-surfaces or molding-jaws B'. Stops $b$ extend from the spindle or its shaft through the spring-jaws to keep the same from spreading too far apart for convenient use, and I make these stops in the form of screws, as will be clearly seen at Fig. 3, in order that they may be more readily adjustable.

C is the loose molding-washer mounted to revolve freely upon the spindle at its base. The face of this washer may be given any configuration desired, and which it is intended to impart to the upper rim of the bottle-neck. In the instance illustrated I have shown it to be formed to produce in the bottle-neck a pair of opposite cavities to permit the insertion of a cork-holding block inserted into the neck of the bottle after the cork has been driven therein, and secured by being turned into the internal groove, (indicated at Fig. 7,) which internal groove may be formed by the projectible points hereinafter to be described. This molding-washer of course comes in contact with the hot glass, and it is desirable that it should be so constructed as to cool rapidly and not retain its heat too long. For this purpose I hollow out the interior of the hub, as shown at $c$, so that the washer will come in contact with the spindle upon which it turns only at two narrow places. The face of the washer is of course given that form which it is intended to impart to the glass. The back of the washer is hollowed out for the purpose of lightness and coolness, as shown at $c'$. Extending through the washer from face to back are fine holes or perforations $c^2$ for the purpose of permitting the air to pass, so that the glass can come in intimate contact with the molding-surface. These holes are so small that the glass will not, at the ordinary temperature at which the tool is used, flow into them. Within the spindle A is a cavity, D, in which are mounted upon pivots a pair of levers, D', carrying at their front ends the projectible points $D^2$, which may be projected through perforations in the spindle to come in contact with and penetrate the glass surrounding the spindle. The rear ends of these levers are attached loosely to the spring-jaws B by pins $d$, between which and the sides of the said spring jaws or arms the curved ends of said levers lie. Upon that portion of the handle grasped by the hand of the operator I apply an exterior guard or coating, E, of non-conducting material, and preferably fibrous asbestus, the purpose of which is to keep the heat of the tool from the hand of the operator.

The operation of my improved tool is as follows: The spindle A is inserted in the neck of the bottle while the latter is in a plastic condition, the loose molding-washer being pressed against the upper edges of the neck. By closing the hand the operator compresses the jaws and brings the molding parts B' thereof against the exterior of the bottle. The bottle is now rotated, the molding-washer rotating with the bottle, while the jaws and the spindle remain stationary. The compression of the jaws has in the meantime, and simultaneously with the closing thereof, projected the points $D^2$ in the plastic glass to form the internal groove.

I claim—

1. The combination, in a tool for forming bottle-necks, of the exterior clamping-jaws, the interior spindle, and the loose washer-mold, the latter being provided with fine perforations or holes to permit the glass to come into close contact with the surface of the mold, substantially as specified.

2. In a tool for forming bottle-necks, the combination, with the interior spindle and exterior clamping-jaws, of projectible points in the spindle for forming an internal groove, and a loose washer-mold fitted to revolve with the bottle, substantially as specified.

3. In a tool for forming bottle-necks having external clamping-jaws and an internal spindle, the combination of said parts with the loose molding-washer, and the projectible points for forming the internal groove, said points being operated by the clamping-jaws, substantially as specified.

WILLIAM A. CASWELL.

Witnesses:
EDWARD S. EVARTS,
EDMUND ADCOCK.